(12) United States Patent
Newman et al.

(10) Patent No.: US 10,865,884 B2
(45) Date of Patent: Dec. 15, 2020

(54) CYLINDER VALVE ASSEMBLY WITH ACTUATABLE ON-OFF CONTROL

(71) Applicant: YSN Imports, Inc., Gardena, CA (US)

(72) Inventors: Shmuel Dovid Newman, Redondo Beach, CA (US); Chin-Cheng Chang, Taichung (TW)

(73) Assignee: YSN Imports, Inc., Gardena, CA (US)

( * ) Notice: Subject to any disclaimer, the term of this patent is extended or adjusted under 35 U.S.C. 154(b) by 0 days.

(21) Appl. No.: 16/050,970

(22) Filed: Jul. 31, 2018

(65) Prior Publication Data

US 2019/0032789 A1    Jan. 31, 2019

Related U.S. Application Data

(60) Provisional application No. 62/539,413, filed on Jul. 31, 2017.

(51) Int. Cl.
*F16K 1/30* (2006.01)
*F16K 5/04* (2006.01)
*F17C 13/04* (2006.01)

(52) U.S. Cl.
CPC .............. *F16K 1/305* (2013.01); *F16K 1/306* (2013.01); *F16K 5/0407* (2013.01); *F17C 13/04* (2013.01); *F17C 2205/0329* (2013.01); *F17C 2205/0332* (2013.01); *F17C 2205/0385* (2013.01); *F17C 2205/0394* (2013.01); *F17C 2227/048* (2013.01)

(58) Field of Classification Search
CPC ........ F16K 1/305; F16K 5/0407; F17C 13/04; Y10T 137/86332
See application file for complete search history.

(56) References Cited

U.S. PATENT DOCUMENTS

| | | | | |
|---|---|---|---|---|
| 2,529,275 A | * | 11/1950 | Blumer | F16K 21/18 137/588 |
| 3,249,119 A | * | 5/1966 | Pollack | F16J 15/127 137/588 |
| 4,510,964 A | * | 4/1985 | Wendling | F16K 1/306 137/210 |
| 8,636,028 B2 | * | 1/2014 | Lane, III | F16K 1/305 137/558 |
| 2004/0154668 A1 | * | 8/2004 | Larsen | F16K 1/305 137/505.25 |
| 2011/0030480 A1 | * | 2/2011 | Newman | G01L 7/041 73/741 |

(Continued)

*Primary Examiner* — Kevin R Barss
(74) *Attorney, Agent, or Firm* — Lance M. Pritikin

(57) ABSTRACT

A cylinder valve assembly includes an actual on-off control subsystem. An intermediate chamber extends between a probe chamber and proximal chamber of the valve body along a main axis. A control port extends radially of the main axis. A valve pin is received by the intermediate chamber and movable between closed and open positions. A control plug is received by the control port and actuatable between on and off positions. Fluid communication between the proximal and probe chambers through the valve body is enabled when the valve pin is in the open position and the control plug is in the on position. Contrastingly, such fluid communication is prevented if either the valve pin is in the closed position or the control plug is in the off position. The control plug is preferably located in radial alignment along the main axis with at least a portion of the valve pin.

20 Claims, 4 Drawing Sheets

(56) References Cited

U.S. PATENT DOCUMENTS

| | | | |
|---|---|---|---|
| 2011/0094608 A1* | 4/2011 | Lane, III | F16K 1/305 137/558 |
| 2011/0114208 A1* | 5/2011 | Newman | F17C 13/04 137/588 |

* cited by examiner

CYLINDER VALVE ASSEMBLY WITH ACTUATABLE ON-OFF CONTROL

RELATED APPLICATIONS

This application claims the benefit of U.S. Provisional Application No. 62/539,413 filed Jul. 31, 2017, the content of which is incorporated by this reference in its entirety for all purposes as if fully set forth herein.

TECHNICAL FIELD

The present invention relates generally to the field of safety devices for the filling and venting of tanks for propane, butane, and other gases that are typically filled while at least primarily in the liquid state. More particularly, the present invention relates to valves and valve bodies in which both fill and pressure relief valves are mounted.

BACKGROUND

What is needed in the described technical field is a more axially-compact multi-functional valve assembly that can function as an interface between adapter fittings such as the CGA-600, and a gas cylinder configured to contain, for example, propane fuel under pressure.

SUMMARY

Certain deficiencies of the prior are overcome by cylinder valve assemblies constructed, implemented and operated in accordance with the present disclosure.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 3:
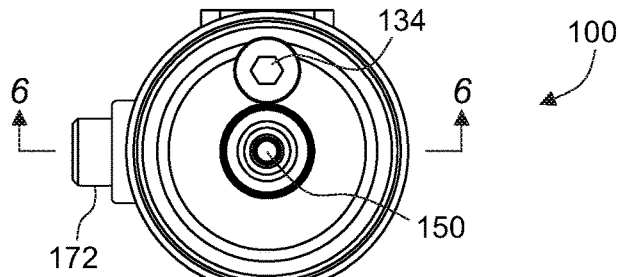
FIG. 3 is a diagrammatic top view of the cylinder valve assembly of FIG. 1.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications.

DETAILED DESCRIPTION OF THE PREFERRED EMBODIMENTS

The following description of preferred embodiments generally relates to combined fill and safety vent plugs. Such plugs serve to mount at least vent and fill valves in a single port in a pressure tank. Such plugs also provide for the mounting of dip tubes, when present, in a single port.

With particular reference to the figures, one or more non-limiting embodiments of a cylinder valve assembly with actuatable on-off control are shown generally at 100.

Figure 1:
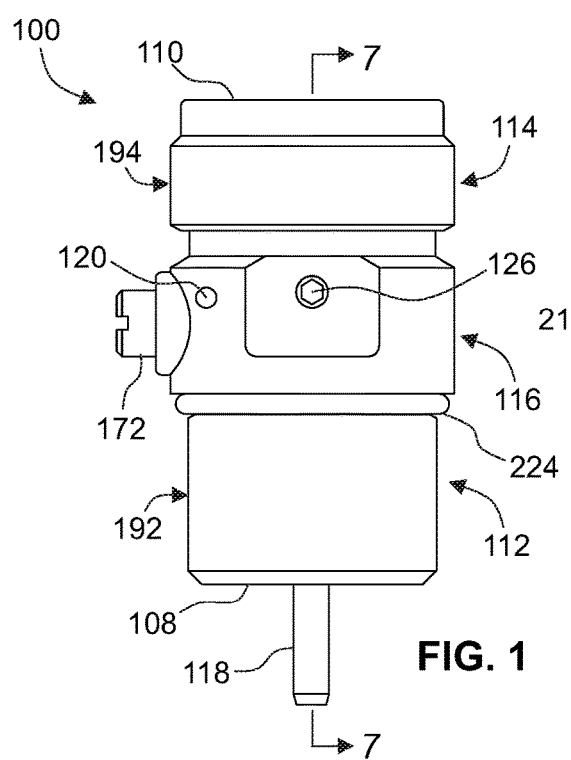
FIG. 1 is a diagrammatic side view of one non-limiting example of a cylinder valve assembly in accordance with the present invention.

Embodiments of a cylinder valve assembly 100 may comprise a valve body 106 extending along a main axis 208 between a proximal end 108 and a distal end 110. Referring to FIG. 1, the valve body 106 may have a proximal portion 112, a distal portion 114 and a medial portion 116 therebetween. The proximal portion 112 may have male threading 192 thereon to facilitate threaded attachment of the valve body 106 to the neck of a pressurizable fluid cylinder 102. The distal portion 114 may have male threading 194 thereon to facilitate threaded connection of a fill or dispense connector 104 to the valve body 106. A tank seal 224 may reside between the proximal portion 112 and the medial portion 116, to ensure a reliable seal exists between the cylinder 102 and the valve body 106 during operation.

Figure 8:
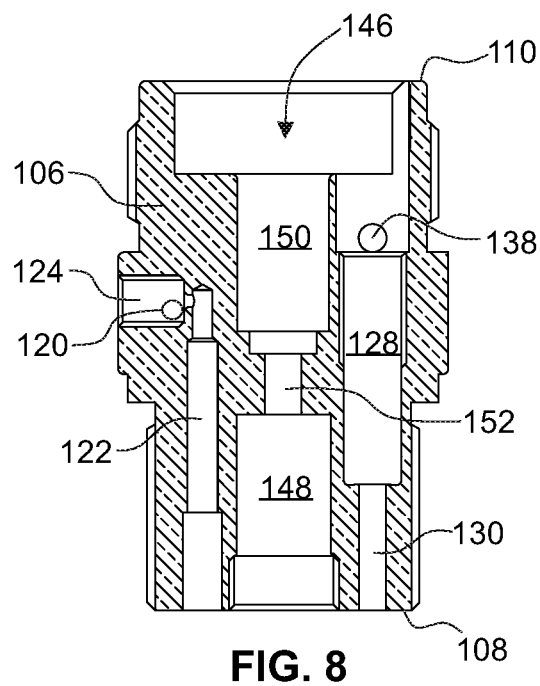
FIG. 8 is a diagrammatic cross-sectional view of a valve body, illustrating various chambers, ports and channels therein.
Figure 11:
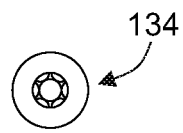
FIG. 11 is a diagrammatic top view of the overpressure ring seat of FIG. 9.
Figures 9, 10:
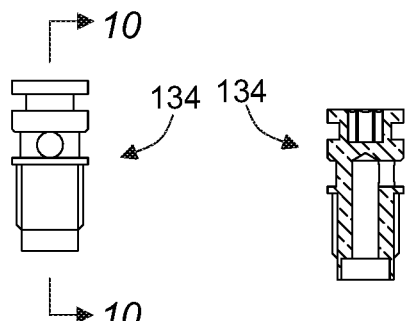
FIG. 9 is a diagrammatic side view of an overpressure ring seat.
FIG. 10 is a diagrammatic cross-sectional view taken across line 10-10 in FIG. 9.
Figure 12:
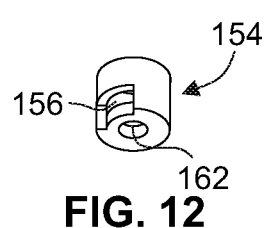
FIG. 12 is a diagrammatic perspective view of a bypass interface element.
Figure 13:
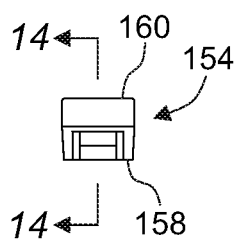
FIG. 13 is a diagrammatic side view of the bypass interface element of FIG. 12.
Figure 14:
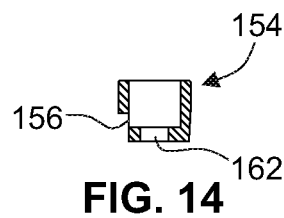
FIG. 14 is a diagrammatic cross-sectional view taken across line 14-14 in FIG. 13.
Figure 15:
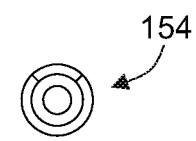
FIG. 15 is a diagrammatic bottom view of the bypass interface element of FIG. 12.
Figures 16, 17:
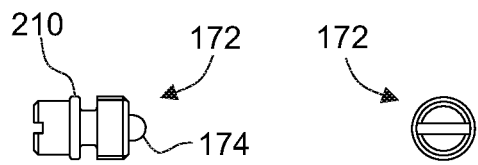
FIG. 16 is a diagrammatic side view of a control plug.
FIG. 17 is a diagrammatic outer end view of the control plug of FIG. 16.

Referring to FIG. 8, the valve body 106 may include a main bore 146. The main bore 146 may comprise a proximal chamber 148, a probe chamber 150 and an intermediate chamber 152 disposed in fluid communication therebetween. An overpressure channel 130 may be in fluid communication with an overpressure valve chamber 128. The overpressure valve chamber 128 may be in valved communication with an overpressure relief port 138. An overfill channel 122 may be in valved communication with a bleed screw port 124 and an overfill relief port 120.

Figure 2:
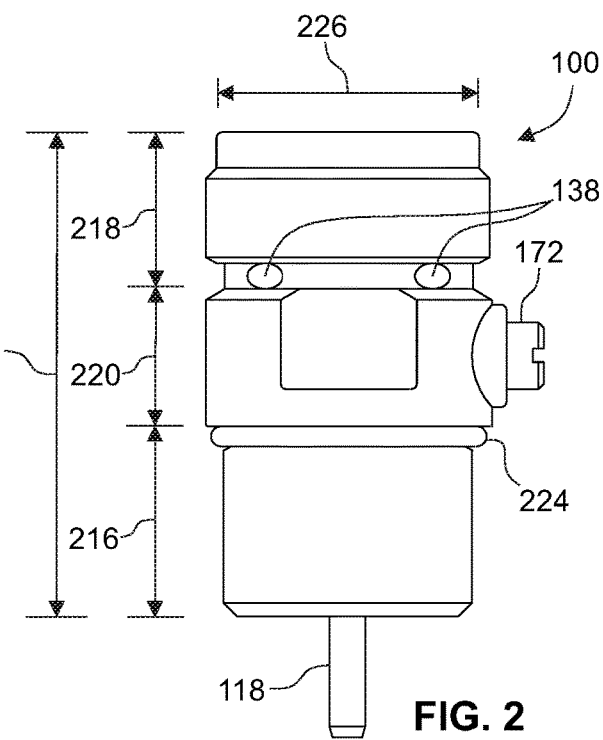
FIG. 2 is a diagrammatic opposing side view of the cylinder valve assembly of FIG. 1.
Figure 4:
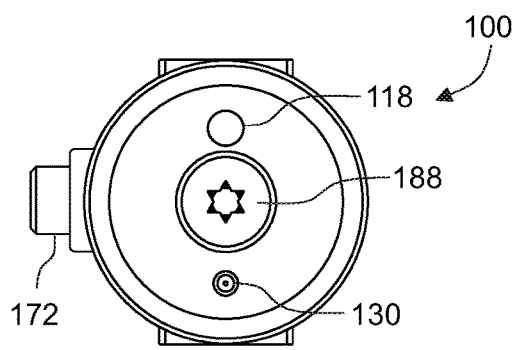
FIG. 4 is a diagrammatic bottom view of the cylinder valve assembly of FIG. 1.
Figure 5:
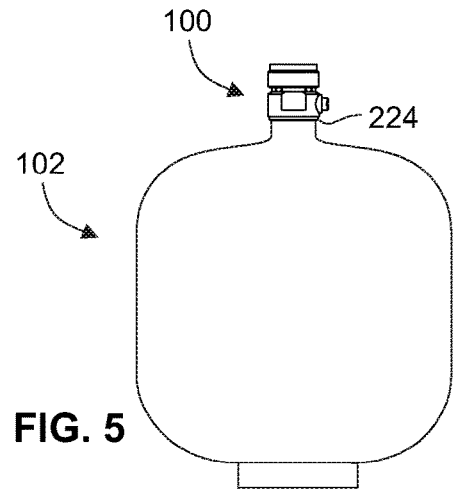
FIG. 5 is a diagrammatic side view of an example cylinder valve assembly installed in an example of a pressurized fluid cylinder.

Referring to FIG. 2, in certain implementations of the cylinder valve assembly 100, the length 214 of the valve body 106 may be, for example, approximately 43.3 mm. In addition, the length 216 of the proximal portion 112 may be approximately 17 mm, the length 218 of the distal portion 114 may be approximately 14 mm, the length 220 of the medial portion 116 may be approximately 10 mm, and the width 226 of the distal portion may be 23.5 mm. In particular preferred implementations of the cylinder valve assembly 100, the combined lengths of the distal portion 114 and medial portion 116 may be between 20-30 mm, or 19-38 mm. Importantly, implementations of the presently-described cylinder valve assembly 100 uniquely allow for an on-off actuatable valve solution with relatively compact profile (e.g., significantly shorter extension height from the tank) compared to the conventional propane and butane combination valve systems, particularly those configured for CGA600-type connections and fittings.

The valve body 106 may house or include provisions for a fill-dispense valve subsystem, an on-off (gating) control subsystem, an overfill relief subsystem, and an overpressure relief subsystem. FIGS. 6A-6D and 7A-7C illustrate examples of the construction and various actuated configurations of these subsystems.

Figure 6A:
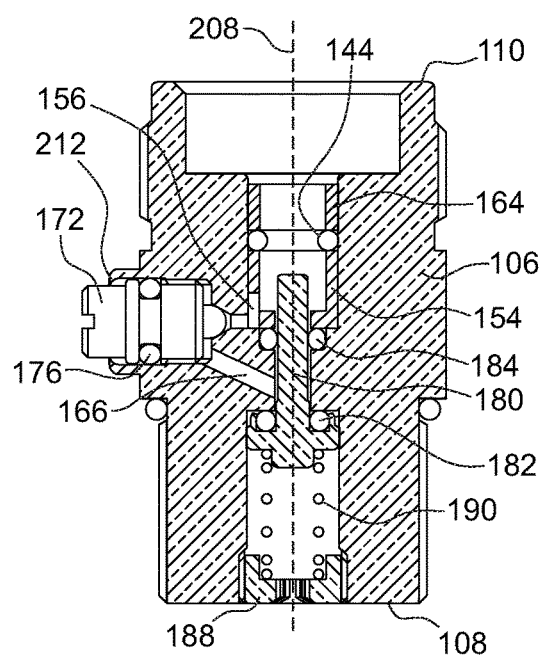
FIG. 6A is a diagrammatic cross-sectional view taken across line 6-6 in FIG. 3, illustrating an on-off control subsystem and fill-dispense valve subsystem, wherein the valve pin is shown in its closed position and the control plug is shown in its off position.

The fill-dispense subsystem may include a proximal chamber 148, a probe chamber 150, an intermediate chamber 152 therebetween, a valve pin 180, a valve pin axial seal 182, a valve pin seat 198, a valve pin radial seal 184, a probe seal 144, a bypass interface element 154, a sleeve 164, and a spring seat 188. The spring seat 188 may be, for example, press-fit or threaded into the proximal chamber 148 at the proximal end 108 of the valve body 106. The valve pin 180 may be movable between a closed position (e.g., as shown in FIG. 6A) and an open position (e.g., as shown in 6B-6D). A valve pin spring 190 may be disposed between the spring seat 188 and the valve pin 180, thereby resiliently-biasing the valve pin 180 toward its closed position. This resilient bias may be configured to be overcome by application of an axial force by a connector probe 142. The probe seal 144 is configured to create a fluid seal between the connector probe 142 and the wall of the probe chamber 150.

Figure 6B:
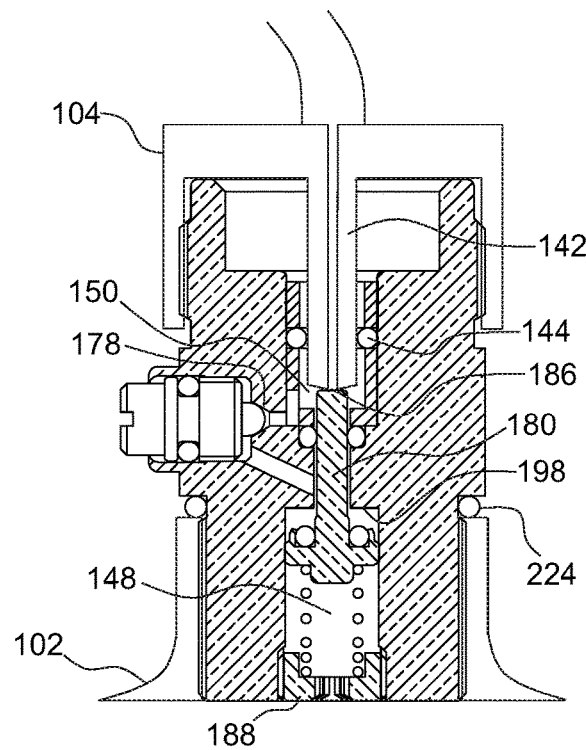
FIG. 6B is a diagrammatic cross-sectional view taken across line 6-6 in FIG. 3, but showing the cylinder valve assembly installed in the neck of a pressurized fluid cylinder, a source or application connector threadedly attached to the distal portion of the valve body, and the connector probe retaining the valve pin in its open position.

As illustrated, for example, in FIGS. 6A and 6B, the valve pin radial seal 184 preferably establishes a fluid seal between the sides of the valve pin 180 and the intermediate chamber 152, so that regardless of whether the valve pin 180 is in its closed position or open position, fluid is prevented from flowing between the proximal chamber and 148 and probe chamber 150 axially directly through the intermediate chamber 152.

The on-off (gating) control subsystem may include a bypass channel 166, a control channel 170 and a control port 168 plugably disposed therebetween. The bypass channel 166 is in fluid communication with the proximal chamber 148, and the control channel 170 is in fluid communication with the probe chamber 150. A control plug 172 may be disposed at least partially within the control port 168, and threadably movable therein between an off position (as shown, for example, in FIG. 6D) and an on position (as shown, for example, in FIG. 6C). The control plug 172 may have a control valve axial seal 174 and a control plug lateral seal 176. Moreover, the control plug 172 may have a tool engagement feature which allows it to be threadedly moved by way of a torqueing tool such as a wrench, flathead screwdriver or the like. The outermost exit 212 of the control port 168 may be peened, or otherwise deformed or treated, to engage the control plug 172 (e.g., at detent 210) to prevent the control plug 172 from being entirely removed or ejected from the control port 168, even when the valve assembly 100 is under pressure.

Figure 6C:
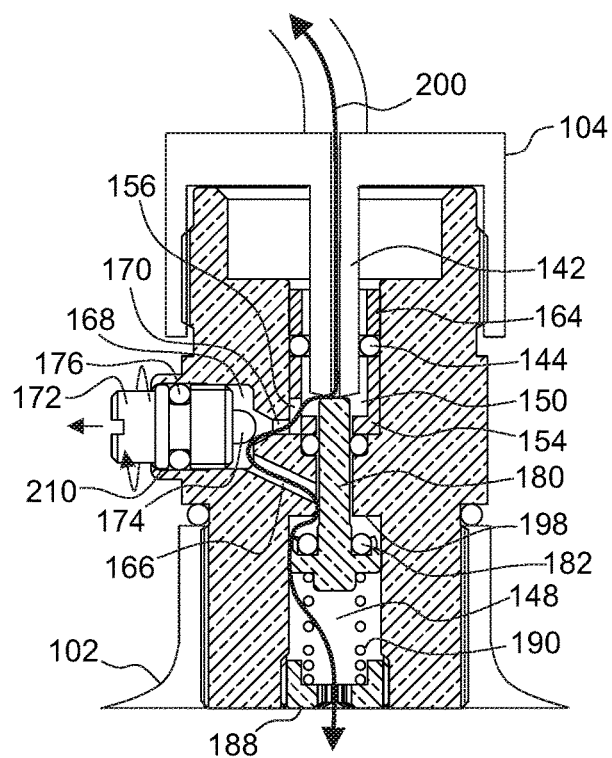
FIG. 6C is a diagrammatic cross-sectional view similar to that of FIG. 6B, but wherein the control plug has been threadedly actuated to its on position, thereby allowing fluid to flow from the connector to the cylinder or from the cylinder to the connector.
Figure 6D:
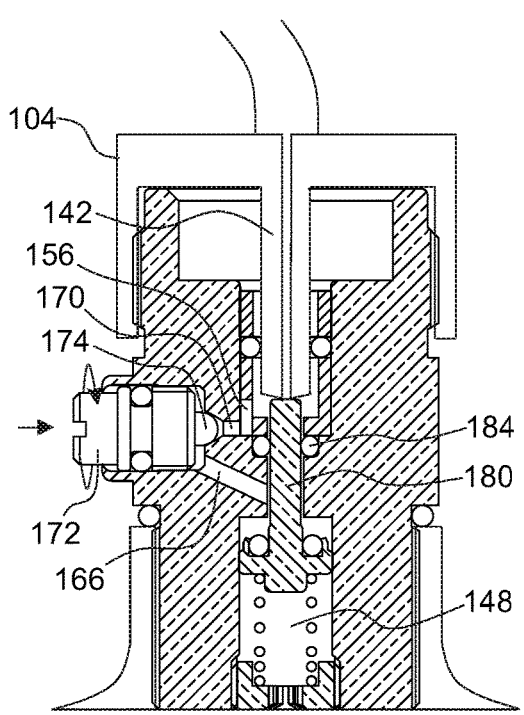
FIG. 6D is a diagrammatic cross-sectional view similar to that of FIG. 6C, but wherein the control plug has been threadedly actuated to its off position, thereby preventing fluid flow from the connector to the cylinder or from the cylinder to the connector, regardless of the position of the valve pin.

FIGS. 6A-6D illustrate a preferred interaction between the fill-dispense valve subsystem and the on-off control subsystem in preferred implementations of a cylinder valve assembly 100. Referring to FIG. 6D, when the control plug 172 is actuated to its off position, the bypass channel 166 and control channel 170 are sealed from fluid communication with one another by way of sealing engagement between the control valve axial seal 174 and its control valve seat 178. Such configuration prevents fluid flow from occurring between the probe chamber 150 and the proximal chamber 148, regardless of the position of the valve pin 180. Contrastingly, referring now to FIG. 6C, when the control plug 172 is in its on position, the bypass channel 166 and control channel 170 are in fluid communication with one another. Such configuration allows fluid to flow between the probe chamber 150 and the proximal chamber 148, when the valve pin 180 is in its open position (See, for example, the illustrated primary flow path 200).

Referring to FIGS. 12-15, the bypass interface element 154 may have a first end 158, a second end 160, a bypass transfer port 156 and a pin relief bore 162. As illustrated for example in FIG. 6C, the bypass transfer port 156 is in fluid communication between the control channel 170 and portion of the probe chamber 150 accessible by the connector probe 142. The pin relief bore 162 allows the probe end 186 of the valve pin 180 to move axially therethrough. The bypass interface element 154 and probe sleeve 164 are preferably axially retained (e.g., by press-fit) within the probe chamber 150. The probe seal 144 is preferably axially secured between the bypass interface element 154 and sleeve 164. The valve pin radial seal 184 is preferably axially secured between the bypass interface element 154 and the annular channel in the upper portion of the intermediate chamber 152.

Figure 7A:
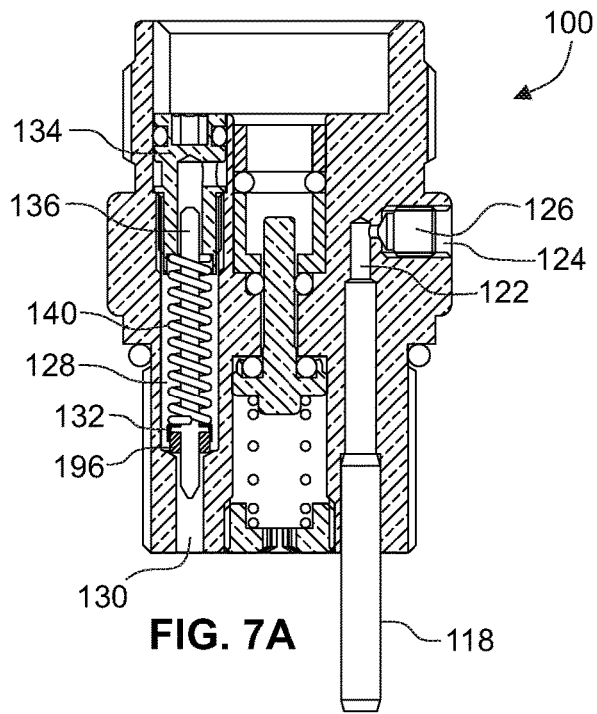
FIG. 7A is a diagrammatic cross-sectional view taken across line 7-7 in FIG. 1, illustrating an overfill relief subsystem and an overpressure relief subsystem, wherein the overfill relief subsystem is in plugged configuration and the overpressure relief subsystem is in its pressure-seal configuration.
Figure 7B:
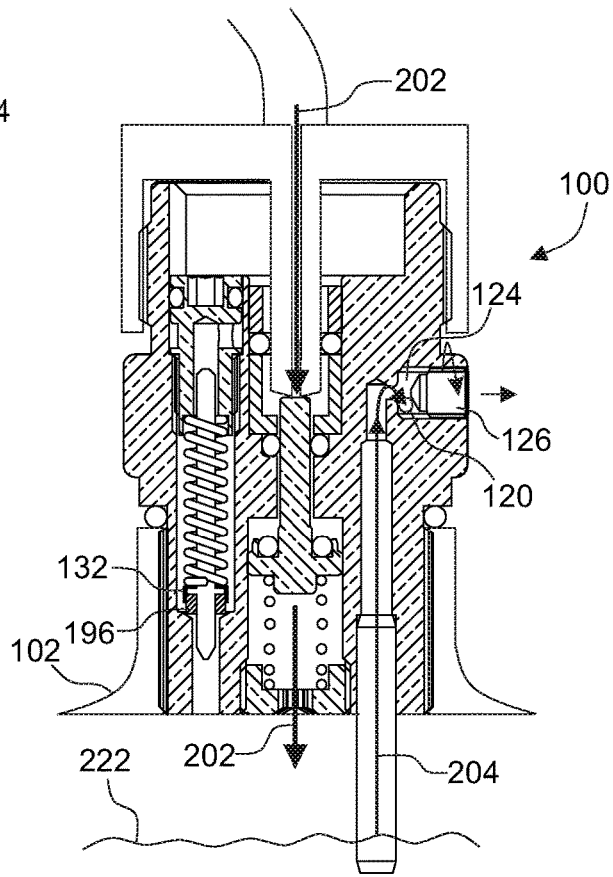
FIG. 7B is a diagrammatic cross-sectional view taken across line 7-7 in FIG. 3, but showing the cylinder valve assembly installed in the neck of a fluid cylinder, a source or application connector threadedly attached to the distal portion of the valve body, and the bleed plug in its overfill-relief position so as to allow liquid reaching the height of the dip tube to be expelled from the overfill relief port during cylinder-filling operations.
Figure 7C:
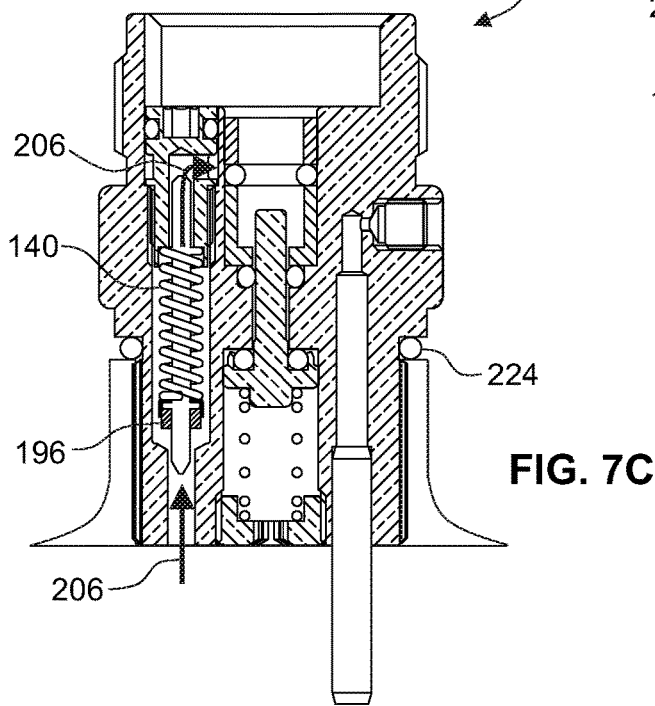
FIG. 7C is a diagrammatic cross-sectional view taken across line 7-7 in FIG. 3, but showing the cylinder valve assembly installed in the neck of a fluid cylinder, and the overpressure relief subsystem is in its pressure-relieving configuration so as to allow excessively-pressurized gas to be expelled from the cylinder out through the overpressure relief ports in the valve body.

Referring to FIGS. 7A-7B, an overfill relief subsystem may include a dip tube 118, an overfill channel 122, a bleed screw port 124, and an overfill bleed screw 126. Referring to FIG. 1, an overfill relief port 120 may be in fluid communication between the bleed screw port and the ambient environment outside of the valve body. The overfill bleed screw 126 may be threadedly moveable between a bleed-seal position (see, for example, FIG. 7A) and a bleed-open position (see, for example, FIG. 7B). When the overfill bleed screw 126 is in its bleed-sealed position, fluid is prevented from entering the bleed screw port 124 from the dip tube 118 and exiting the overfill relief port 120. In contrast, when the overfill bleed screw 126 is in its bleed-open position, overfilled liquid 222 reaching the height of the dip tube 118 is free to flow (see, e.g., overfill flow path 204) into the bleed screw port 124 and discharge from the overfill relief port 120 (e.g., under the force produced by the vapor pressure within the cylinder 102). This overfill relief capability is generally used during the course of gravity-filling the cylinder 102, as illustrated by fill inlet flow path 202.

Referring again to FIGS. 7A-7C an overpressure relief subsystem may include an over pressure channel 130, an overpressure valve chamber 128, an over pressure relief port 138, a valve axle 136, an overpressure valve sleeve 132, an overpressure gasket 196, an overpressure valve spring 140, and an overpressure ring seat 134. The overpressure gasket 196 and valve axle 136 are movable between an overpressure seal position (see, for example, FIG. 7A) and overpressure relief position (see, for example, FIG. 7C). The overpressure valve spring 140 is axially disposed between the overpressure valve sleeve 132 and the overpressure ring seat 134, and elastically biases the overpressure gasket 196 toward its over pressure seal position. This resilient bias may be overcome by an excess vapor pressure building up within the pressurized cylinder 102. The threshold at which the vapor pressure is considered to be excessive ("threshold pressure") would generally be prescribed or dictated by the operating requirements of the particular cylinder valve assembly, based on its intended application. The spring constant of the overpressure valve spring 140 would be selected accordingly.

When the overpressure gasket 196 and valve axle 136 are in their overpressure seal position, pressurized gas is prevented from flowing from the overpressure channel 130 to the overpressure relief ports 138. In contrast, when the overpressure gasket 196 and valve axle 136 are in their overpressure relief position, pressurized gas is able to flow (see, e.g., overpressure flow path 206) from the overpressure channel 130 to the overpressure relief ports 138 and be expelled therefrom.

A preferred implementation of a cylinder valve assembly 100 with actuatable on-off-control in accordance with the present disclosure may comprise a valve body 106, a valve pin 180 and a control plug 172.

The valve body 106 may include a probe chamber 150 and a proximal chamber 148 disposed along a main axis 208, an intermediate chamber 152 extending along the main axis 208 between the probe chamber 150 and the proximal chamber 148, and a control port 168 extending radially of the main axis 206.

The valve pin 180 is preferably at least partially received by the intermediate chamber 152 and is movable along the main axis 208 between a closed position and an open position.

Referring to FIGS. 6C and 6D, the control plug 172 is preferably received by the control port 168 and is actuatable between an on position and an off position. Such actuation may preferably be threaded actuation. Moreover, the control plug 172 may preferably include a tool engagement feature (see, e.g., FIG. 1) configured to be engaged by a torqueing tool external to the valve body to facilitate the threaded actuation.

Referring to FIG. 6C, fluid communication between the proximal chamber 148 and the probe chamber 150 through the valve body 106 is configured to be enabled when the valve pin 180 is in the open position and the control plug 172 is in the on position. Contrastingly, referring to FIG. 6A, fluid communication between the proximal chamber 148 and the probe chamber 150 through the valve body 106 is configured to be prevented if the valve pin 180 is in the closed position, or the control plug 172 is in the off position.

Referring to FIGS. 6A-6D, the control plug 172 is preferably located in radial alignment along the main axis 208 with at least a portion of the valve pin 180 when the valve pin 180 is in the closed position and the open position.

Referring to FIGS. 6C and 8, The valve body 106 may further include a bypass channel 166 in fluid communication between the intermediate chamber 152 and the control port 168, and a control channel 170 configured to be in fluid communication between the control port 168 and the probe chamber 150 when the control plug 172 is in the on position.

Referring to FIGS. 6B and 6C, the control channel 170 may include a control valve seat 178. Moreover, the control plug 172 may include a control valve axial seal 174 configured to (i) be in sealing engagement with the control valve seat 178 when the control plug 172 is in the off position, thereby sealing the control channel 170 from fluid communication with the control port 168; and (ii) be disengaged from the control valve seat 178 when the control plug 172 is in the on position, thereby allowing fluid communication between the control channel 170 and the control port 168.

Referring to FIGS. 6A-6D, certain embodiments of the assembly 100 may further comprise a control plug lateral seal 176 disposed about the control plug 172 and configured to seal the control port 168 from fluid communication with an ambient environment (i.e., the ambient environment outside of the valve assemble 100).

Referring to FIGS. 6A, 6C and 8, particular preferred embodiments of a cylinder valve assembly 100 may further comprise a valve pin radial seal 184 for preventing fluid communication between the intermediate chamber 152 and the probe chamber 150 independently of the control port 168. In such cases, the valve pin 180 may be configured to slidably extend through the valve pin radial seal 184.

Referring to FIGS. 6C and 12-15, preferred embodiment of a cylinder valve assembly 100 in accordance with the present disclosure may further comprising a bypass interface element 154. The bypass interface element 154 may preferably include a pin relief bore 162 through which the valve pin axially slidably extends 180, and (b) a bypass transfer port 156 in fluid communication between the control channel 168 and the probe chamber 150. Referring to FIGS. 6A and 8, the bypass interface element 154 may axially retain the valve pin radial seal 184 within an annular channel of the intermediate chamber 152.

Referring to FIG. 6A, preferred embodiments of the assembly 100 may further comprise a retention sleeve 164 and an annular probe seal 144. The probe seal 144 may be axially secured between the retention sleeve 164 and the bypass interface element 154. Referring to FIG. 6B, the probe seal 144 may be configured to create a fluid seal between a lateral wall of the probe chamber 150 and a connector probe 142 inserted into the probe chamber 150.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cylinder valve assembly with actuatable on-off-control, the assembly comprising:
    a valve body including
        (a) a probe chamber and a proximal chamber disposed along a main axis,
        (b) an intermediate chamber extending along the main axis between the probe chamber and the proximal chamber, and
        (c) a control port extending radially of the main axis;
    a valve pin at least partially received by the intermediate chamber and movable along the main axis between a closed position and an open position; and
    a control plug received by the control port and actuatable between an on position and an off position;
    wherein fluid communication between the proximal chamber and the probe chamber through the valve body is configured to be
        (a) enabled when the valve pin is in the open position and the control plug is in the on position, and
        (b) prevented if
            (i) the valve pin is in the closed position, or
            (ii) the control plug is in the off position; and
    wherein the control plug is located in radial alignment with at least a portion of the valve pin when the valve pin is in the closed position and the open position, the radial alignment being defined perpendicularly to the main axis.

2. A cylinder valve assembly as defined in claim 1 wherein the valve body further includes
    (a) a bypass channel in fluid communication between the intermediate chamber and the control port; and
    (b) a control channel configured to, irrespective of whether the valve pin is in the closed position or open position, be in fluid communication between the control port and the probe chamber when the control plug is in the on position.

3. A cylinder valve assembly as defined in claim 2 wherein
    (a) the control channel includes a control valve seat; and
    (b) the control plug includes a control valve axial seal configured to
        (i) be in sealing engagement with the control valve seat when the control plug is in the off position, thereby sealing the control channel from fluid communication with the control port; and
        (ii) be disengaged from the control valve seat when the control plug is in the on position, thereby allowing fluid communication between the control channel and the control port.

4. A cylinder valve assembly as defined in claim 3 further comprising a control plug lateral seal disposed about the control plug and configured to seal the control port from fluid communication with an ambient environment.

5. A cylinder valve assembly as defined in claim 2 further comprising a valve pin radial seal for preventing fluid communication between the intermediate chamber and the probe chamber independently of the control port, the valve pin slidably extending through the valve pin radial seal.

6. A cylinder valve assembly as defined in claim 5 further comprising a bypass interface element including
    (a) a pin relief bore through which the valve pin axially slidably extends, and
    (b) a bypass transfer port in fluid communication between the control channel and the probe chamber.

7. A cylinder valve assembly as defined in claim 6 wherein the bypass interface element axially retains the valve pin radial seal within an annular channel of the intermediate chamber.

8. A cylinder valve assembly as defined in claim 7 further comprising a retention sleeve and an annular probe seal, the probe seal
    (a) being axially secured between the retention sleeve and the bypass interface element, and
    (b) configured to create a fluid seal between a lateral wall of the probe chamber and a connector probe inserted into the probe chamber.

9. A cylinder valve assembly as defined in claim 1 wherein the control plug is threadedly actuatable between the on and off positions.

10. A cylinder valve assembly as defined in claim 9 wherein the control plug includes a tool engagement feature configured to be engaged by a torqueing tool external to the valve body to facilitate the threaded actuation.

11. A cylinder valve assembly as defined in claim 1 further comprising a valve pin axial seal, wherein
    (a) the proximal chamber includes a valve pin seat,
    (b) when the valve pin is in the closed position, the valve pin axial seal engages the valve pin seat so as to seal the proximal chamber from fluid communication with the intermediate chamber, and
    (c) when the valve pin is in the open position, the valve pin axial seal is out of engagement with the valve pin seat so as allow the proximal chamber to be in fluid communication with the intermediate chamber.

12. A cylinder valve assembly as defined in claim 11 further comprising a valve pin spring disposed between a spring seat and the valve pin, thereby resiliently-biasing the valve pin toward the closed position, the resilient bias being configured to be overcome by an axial force exerted by a connector probe inserted into the probe chamber.

13. A cylinder valve assembly comprising:
    a valve body including
        (a) a probe chamber and a proximal chamber disposed along a main axis,
        (b) an intermediate chamber extending along the main axis between the probe chamber and the proximal chamber,
        (c) a control port extending radially of the main axis,
        (d) a bypass channel in fluid communication between the intermediate chamber and the control port, and
        (e) a control channel including a control valve seat and being disposed between the control port and the probe chamber;
    a valve pin at least partially received by the intermediate chamber and movable along the main axis between a closed position and an open position; and
    a control plug received by the control port and being threadedly actuatable between an on position and an off position, the control plug including a control valve axial seal configured to
        (a) be in sealing engagement with the control valve seat when the control plug is in the off position, thereby sealing the control channel from fluid communication with the control port, and
        (b) be disengaged from the control valve seat when the control plug is in the on position, thereby allowing fluid communication between the control channel and the control port;
    wherein
        (a) when the valve pin is in the open position and the control plug is in the on position, the proximal chamber and the probe chamber are in fluid communication with one another through the valve body by way of the intermediate chamber, the bypass channel, the control port and the control channel, and (b) when either the valve pin is in the closed position or the control plug is in the off position, the proximal chamber and the probe chamber sealed from fluid communication with one another through the valve body.

14. A cylinder valve assembly as defined in claim 13 wherein the control plug is located in radial alignment along the main axis with at least a portion of the valve pin when the valve pin is in the closed position and the open position.

15. A cylinder valve assembly as defined in claim 13 further comprising a valve pin radial seal for preventing fluid communication between the intermediate chamber and the probe chamber independently of the control port, the valve pin slidably extending through the valve pin radial seal.

16. A cylinder valve assembly as defined in claim 15 further comprising a bypass interface element including (a) a pin relief bore through which the valve pin axially slidably extends, and (b) a bypass transfer port in fluid communication between the control channel and the probe chamber.

17. A cylinder valve assembly as defined in claim 16 wherein the bypass interface element axially retains the valve pin radial seal within an annular channel of the intermediate chamber.

18. A cylinder valve assembly as defined in claim 17 further comprising a retention sleeve and an annular probe seal, the probe seal (a) being axially secured between the retention sleeve and the bypass interface element and (b) configured to create a fluid seal between a lateral wall of the probe chamber and a connector probe inserted into the probe chamber.

19. A cylinder valve assembly as defined in claim 13 wherein the control plug includes a tool engagement feature configured to be engaged by a torqueing tool external to the valve body to facilitate the threaded actuation.

20. A cylinder valve assembly as defined in claim 13 further comprising an overfill relief subsystem and an overpressure relief subsystem.

* * * * *